US009012103B2

(12) United States Patent
Heise

(10) Patent No.: US 9,012,103 B2
(45) Date of Patent: *Apr. 21, 2015

(54) SENSOR INTEGRATED GLASS BULB TEMPERATURE PRESSURE RELIEF DEVICE DESIGN FOR HYDROGEN STORAGE SYSTEMS

(71) Applicant: GM Global Technology Operations LLC, Detroit, MI (US)

(72) Inventor: Axel Heise, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/759,380

(22) Filed: Feb. 5, 2013

(65) Prior Publication Data
US 2014/0220469 A1    Aug. 7, 2014

(51) Int. Cl.
| | |
|---|---|
| H01M 8/06 | (2006.01) |
| F16K 31/00 | (2006.01) |
| H01M 8/04 | (2006.01) |
| F16K 37/00 | (2006.01) |
| F17C 13/04 | (2006.01) |
| F16K 17/38 | (2006.01) |

(52) U.S. Cl.
CPC ......... *F16K 31/002* (2013.01); *H01M 8/04201* (2013.01); *F16K 37/0091* (2013.01); *F17C 13/04* (2013.01); *F16K 17/383* (2013.01)

(58) Field of Classification Search
CPC .................. H01M 8/04201; F16K 31/002
USPC ........................................... 429/442
See application file for complete search history.

(56) References Cited

U.S. PATENT DOCUMENTS

| | | | |
|---|---|---|---|
| 5,788,212 A | 8/1998 | Hackman et al. | |
| 6,286,536 B1 * | 9/2001 | Kamp et al. | 137/68.13 |
| 6,321,771 B1 * | 11/2001 | Brazier et al. | 137/68.23 |
| 7,971,798 B2 | 7/2011 | Pechtold | |
| 2007/0020510 A1 * | 1/2007 | Dunn et al. | 429/65 |

* cited by examiner

Primary Examiner — Jonathan Jelsma
(74) Attorney, Agent, or Firm — Dinsmore & Shohl LLP

(57) ABSTRACT

A TPRD for a high pressure storage vessel including an integrated pressure sensor cooperative with an activation mechanism and a method of monitoring a TPRD for use in a fuel cell system. The TPRD comprises a release piston, moveable between an open and a closed position, which controls the flow of gas from a fuel storage vessel through a gas outlet port. The thermally activated activation mechanism comprises a gas-inlet chamber and a liquid-filled bulb having an air bubble. Upon activation, the release piston moves from the closed position to the open position. The integrated pressure sensor detects the pressure within the TPRD. A difference in pressure between that of the fluid within the fuel storage vessel and the pressure within the TPRD provides indicia of impaired movement of the release piston.

9 Claims, 5 Drawing Sheets

SENSOR INTEGRATED GLASS BULB TEMPERATURE PRESSURE RELIEF DEVICE DESIGN FOR HYDROGEN STORAGE SYSTEMS

BACKGROUND

The present invention relates generally to a temperature pressure relief device (TPRD) for a high pressure storage vessel and more particularly to an integrated pressure sensor TPRD for fuel storage systems.

Electrochemical conversion cells, commonly referred to as fuel cells, produce electrical energy by processing reactants, for example, through the oxidation and reduction of hydrogen and oxygen. Hydrogen is a very attractive fuel because it is clean and can be used to produce electricity efficiently in a fuel cell. The automotive industry has expended significant resources in the development of hydrogen fuel cells as a source of power for vehicles. Vehicles powered by hydrogen fuel cells would be more efficient and generate fewer emissions than today's vehicles employing internal combustion engines.

In a typical fuel cell system, hydrogen or a hydrogen-rich gas is supplied as a reactant to the anode side of a fuel cell while oxygen (such as in the form of atmospheric oxygen) is supplied as a reactant to the cathode side of the fuel cell. One form of fuel cell, called the proton exchange membrane (PEM) fuel cell, has shown particular promise for vehicular and related mobile applications. The electrolyte layer of a PEM fuel cell is in the form of a solid proton-transmissive membrane (such as a perfluorosulfonic acid membrane, a commercial example of which is Nafion™). The presence of an anode separated from a cathode by an electrolyte layer forms a single PEM fuel cell; many such single cells can be combined to form a fuel cell stack, increasing the power output thereof. Multiple stacks can be coupled together to further increase power output.

The hydrogen for the fuel cell is commonly stored in a lightweight, high-pressure vessel resistant to puncture. These high-pressure vessels generally include a TPRD. The TPRD is in fluid communication with the interior of the vessel and is configured to vent the vessel gas when activated. Activation of the TPRD may occur in response to an emergency, for example, in the case of a fire. Activation of the TPRD allows the vessel gas to be released from the system. A typical high-pressure vessel TPRD includes a single-use activation mechanism, for example a liquid-filled bulb with an air bubble. The air bubble expands when heated and bursts the liquid-filled bulb upon reaching a specified temperature. A release piston, held in place by the intact bulb, is released when the liquid-filled bulb bursts, opening the gas release valve. The gas then escapes through the relief valve to avoid overpressure conditions due to high temperatures and related damage to the system.

In some cases, the release piston may become stuck due to mechanical blocking, for example corrosion or by other mechanical impacts between the piston and housing, during the TPRD lifetime. When this happens, the release piston will not move, even upon bursting of the liquid-filled bulb, and the vessel gas cannot be vented. Currently, there is no way to monitor the TPRD for mechanical blocking and related lack of release piston moveability.

SUMMARY

In accordance with the instant disclosure, a TPRD for a high pressure storage vessel is shown. According to one embodiment of the present invention, an integrated pressure sensor TPRD for the hydrogen storage system of a fuel-cell based propulsion system is described and includes a TPRD for use with a fuel storage tank. The TPRD comprises a housing having a conduit and a gas outlet port whereby gas may flow through the housing from the fuel storage tank. A release piston, disposed within the conduit, is moveable between an open and a closed position. When the release piston is in the closed position, gas cannot flow from the fuel storage tank through the gas outlet port. An activation mechanism within the TPRD includes a gas-inlet chamber and a liquid-filled bulb having an air bubble. Upon a rise in temperature within the fuel storage tank, the air bubble expands and bursts the bulb to permit movement of the release piston from the closed position to the open position. A pressure sensor, cooperative with the activation mechanism, may detect a difference in pressure between that of the fluid within the fuel storage tank and, depending on position of the pressure sensor, the pressure exerted on the bulb by the release piston or the pressure exerted on the release piston due to the pressure within the fuel storage tank. Upon detecting such a difference in pressure, a signal is generated to provide indicia of impaired movement of the release piston.

According to another embodiment of the present invention, a fuel cell system is described. The system includes a fuel cell stack made up of numerous fuel cells each of which comprise an anode to accept a hydrogen-bearing fluid, a cathode to accept an oxygen-bearing fluid, and a medium cooperative with the anode and the cathode to pass at least one catalytically-ionized reactant between them. The fuel cell system includes a fuel storage vessel and an integrated pressure sensor TPRD as shown and described above.

According to another aspect of the present invention, a method of monitoring a TPRD for use in an automotive fuel cell system is described. The method includes storing a gas in a fuel storage tank and determining the moveability of a release piston by detecting a pressure difference between the gas in the fuel storage tank and the pressure within a TPRD. The TPRD, which is in fluid communication with the fuel storage tank, comprises a pressure sensor, a release piston, and a liquid-filled bulb situated contiguously.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION

An embodiment of the present invention includes a high-pressure vessel with a TPRD coupled to the interior of the high-pressure vessel configured to vent the gas contained within the vessel (the vessel gas) upon activation of the TPRD. Activation of the TPRD may occur in response to an increase in temperature within the high-pressure vessel and allows the vessel gas to be released from the system. A liquid-filled bulb containing an air bubble holds a gas release piston in place. The air bubble, which is in thermal communication with the vessel gas, expands upon reaching a specified temperature and bursts the liquid-filled bulb, thereby releasing the release piston, which in turn opens the gas release valve. The gas then escapes through the gas relief valve to avoid overpressure conditions. To detect the moveability of the release piston, a pressure sensor may be situated between the liquid-filled bulb and the release piston or the liquid-filled bulb may be situated between the release piston and the pressure sensor. When the pressure sensor is situated between the liquid-filled bulb and the release piston, the pressure sensor detects the pressure exerted by the release piston due to gas pressure within the vessel. When the liquid-filled bulb is situated between the pressure sensor and the release piston, the pressure sensor detects the pressure on the liquid-filled bulb exerted by the release piston due to gas pressure within the vessel. If this pressure detected is different (i.e. a pressure delta exists) from the pressure within the gas vessel (detected remotely), this indicates that either the vessel gas cannot reach the piston or that the piston is no longer in contact with the liquid-filled bulb because there is a blockage within the conduit. Such a blockage prevents the piston from moving even upon bursting or related removal of the liquid-filled bulb.

Figure 1:
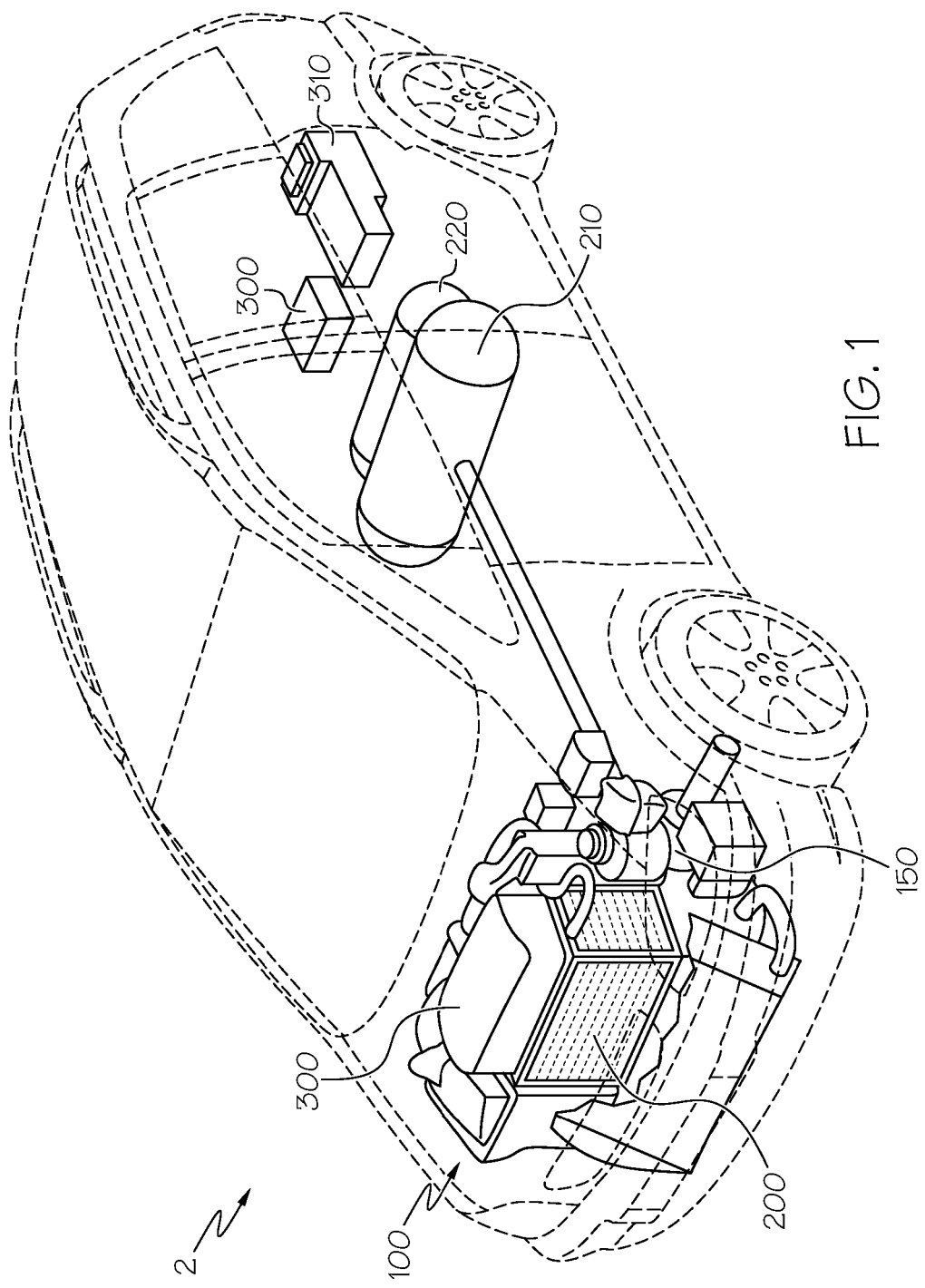
FIG. 1 is a perspective cutaway view of a vehicle with a fuel cell propulsion system.

Referring first to FIG. 1, vehicle 2 is shown, according to embodiments shown and described herein. Vehicle 2 (for example, a car, bus, truck, or motorcycle) includes a fuel-cell based propulsion system 100 made up of an electric motor 150 that receives its electric power from a fuel cell stack 200 that includes numerous individual fuel cells. In a preferred form, the propulsion system 100 is hydrogen-based and may include one or more fuel storage gas vessels 210, 220 (shown notionally here, as well as in more detail in FIG. 2), as well as power converters or related electronics 300, electrical storage devices (e.g., batteries 310, ultra-capacitors or the like) and controllers that provide control over its operation, and any number of valves, compressors, tubing, temperature regulators, and other ancillary equipment. The notional depiction of fuel storage gas vessels 210, 220 is not meant to represent a particular shape, dimension, or related configuration, and that such feature may be tailored depending on the configurational needs of the chassis 2 that is shown in FIG. 2 will be understood to those skilled in the art.

Any number of different types of fuel cells may be used to make up the stack 200 of the propulsion system 100; these cells may be of the metal hydride, alkaline, electrogalvanic, or other variants. In one preferred (although not necessary) form, the fuel cells are PEM fuel cells as discussed above. Stack 200 includes multiple such fuel cells combined in series and/or parallel in order to produce a higher voltage and/or current yield. The produced electrical power from propulsion system 100 may then be supplied directly to electric motor 150 or stored within a battery 310, capacitor or related electrical storage device (not shown) for later use by vehicle 2.

Figure 2:
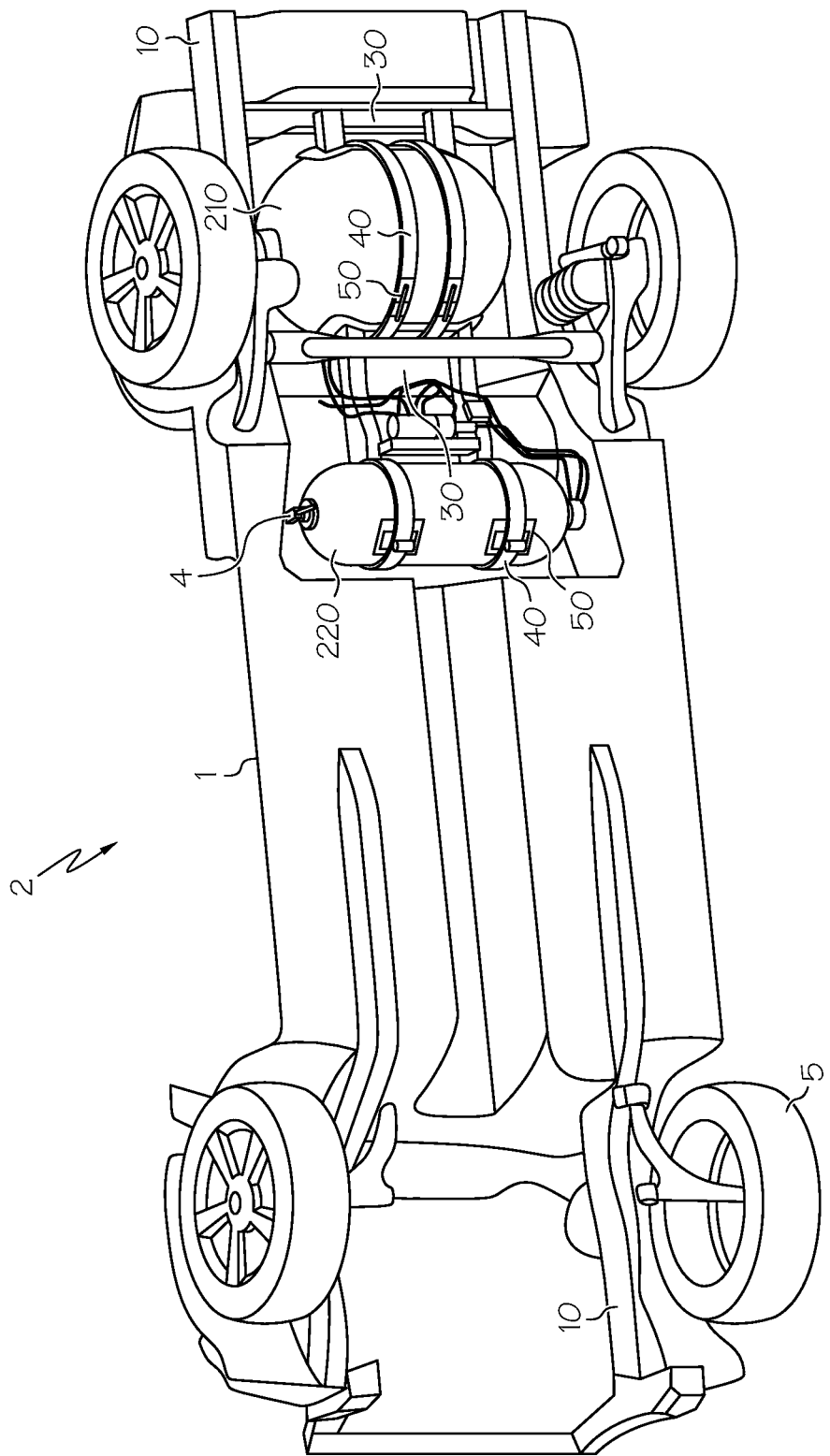
FIG. 2 is a simplified underside view of the chassis of the vehicle of FIG. 1, highlighting notional placement of a TPRD according to an aspect of the present invention, as well as its placement within a fuel cell propulsion system.

Referring next to FIG. 2, a tank-mounting arrangement for a high pressure hydrogen storage tank shows a chassis 1 of vehicle 2 with four wheels 5 mounted to a frame 10 made from longitudinally-oriented sections of tubular steel. Frame 10 provides the primary structural support for most of the remaining components of chassis 1, as well as the body of the vehicle 2; much of the load-bearing capability inherent in frame 10 is due to its size, shape, material choice and related design attributes that are understood by those skilled in the art. A fuel-cell based propulsion system 100 as shown in FIG. 1 may be situated in any convenient location within the chassis 1, for example, between the front wheels 5 shown on the left side of the figure. Gaseous fuel for use in fuel-cell based propulsion system 100 is stored in one or more gas vessels also referred to herein as fuel storage tanks 210, 220. In the version depicted in FIG. 2, a pair of such tanks includes a larger main gas vessel 210 and a smaller secondary gas vessel 220. Both vessels 210, 220 may be secured to chassis 1 by known means, such as crossbars 30, straps 40 and handles 50. It will be understood that any tank-mounting arrangement, fuel cell system based propulsion system, or high pressure tank storage system may be compatible with the present invention.

Figure 3:
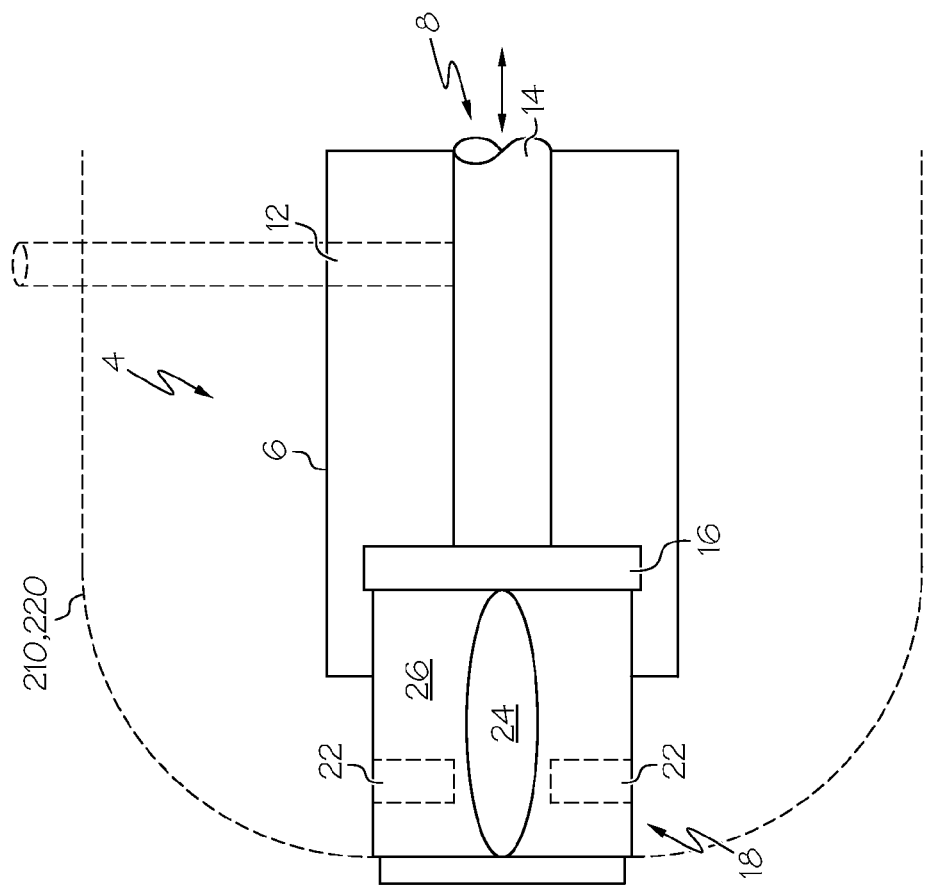
FIG. 3 is a simplified view of a TPRD system according to the present disclosure.

Referring now to FIG. 3, a TPRD 4 within a gas vessel 210, 220 is shown. The TPRD 4 is in fluid communication with the interior of a gas vessel 210, 220 and is configured to vent the gas within the gas vessel 210, 220 when actuated. The TPRD 4 includes a housing 6 having a conduit 8 and a gas outlet port 12 configured to allow gas to flow through the housing 6 from the gas vessel 210, 220. Slidably disposed within the conduit 8 (shown in FIG. 5) is a release piston 14 which may move between a closed position (as presently shown) and an open position when the TPRD 4 is actuated. The TPRD 4 may be actuated when a predetermined temperature is reached. When the release piston 14 is in the closed position (as shown in FIG. 3), gas cannot flow from the gas vessel 210, 220 to the ambient atmosphere out of the gas outlet port 12 via the conduit 8 because the release piston 14 blocks both the conduit 8 and the gas outlet port 12. However, when the release piston 14 moves from the closed to the open position (shown in FIG. 5), both the conduit 8 and the gas outlet port 12 are unblocked allowing vessel gas to flow through the housing 6 from the gas vessel 210, 220. The TPRD 4 further comprises a pressure sensor 16 and an activation mechanism 18. The activation mechanism 18 comprises at least one gas-inlet chamber 22 and a liquid-filled bulb 24 having an air bubble. Gas from the gas vessel 210, 220 travels through the gas-inlet chamber 22 to expose the liquid-filled bulb 24 to the environment within the gas vessel 210, 220. When a rise in temperature occurs within the gas vessel 210, 220, the air bubble expands and bursts the liquid-filled bulb 24 allowing the release piston 14 to move through the conduit 8 and into the space vacated by the liquid-filled bulb. This unblocks both the conduit 8 and the gas outlet port 12 and allows gas to flow from the gas vessel 210, 220 through the conduit 8 and out to the atmosphere via outlet port 12. This movement allows the gas to be vented from the gas vessel 210, 220 preventing overpressure conditions because of a rise in temperature typically due to a fire in or around the gas vessel 210, 220. The activation mechanism 18 is disposed within a protection cap 26 that isolates the liquid-filled bulb 24 from the environment of the gas vessel 210, 220.

To determine the moveability of the release piston 14, the pressure within the TPRD 4 is compared to the pressure within the gas vessel 210, 220. A detected pressure differential between the pressure within the TPRD 4 and the pressure within the gas vessel 210, 220 indicates that the release piston 14 is immoveable. The integrated pressure sensor 16 allows for online monitoring of the moveability of the release piston 14 in the installed TPRD 4. This safety feature allows for monitoring over the life of the system. The pressure sensor 16, the release piston 14, and the liquid-filled bulb 24 are situated contiguously, that is, in sequence wherein the pressure sensor 16, the release piston 14, and the liquid-filled bulb 24 are touching.

In the embodiment shown in FIG. 3, the pressure sensor 16 is situated between the release piston 14 and the liquid-filled bulb 24. The pressure sensor 16 detects the pressure exerted by the release piston 14 due to the pressure within the gas vessel 210, 220. If the release piston 14 is not blocked (i.e., is moveable along the direction indicated by the arrow rather than "frozen" in place due to corrosion, wear, damage, or other impediments), the pressure exerted on the pressure sensor 16 by the release piston 14 will be the same as the pressure within the gas vessel 210, 220 (i.e. the pressure throughout the system will be equalized). However, if the release piston 14 is blocked or otherwise prevented from moving, there will be a difference in pressure between the pressure within the gas vessel 210, 220 and the pressure exerted by the release piston 14. This could be because some mechanical blockage prevents the gas from the gas vessel 210, 220 from reaching the release piston 14. This signals that the release piston 14 is immovable and thus, will not move from the closed position to the open position even if the liquid-filled bulb 24 breaks. This prevents overpressure conditions and related damage to the system from failure to vent the gas vessel 210, 220 in an emergency situation.

Figure 4:
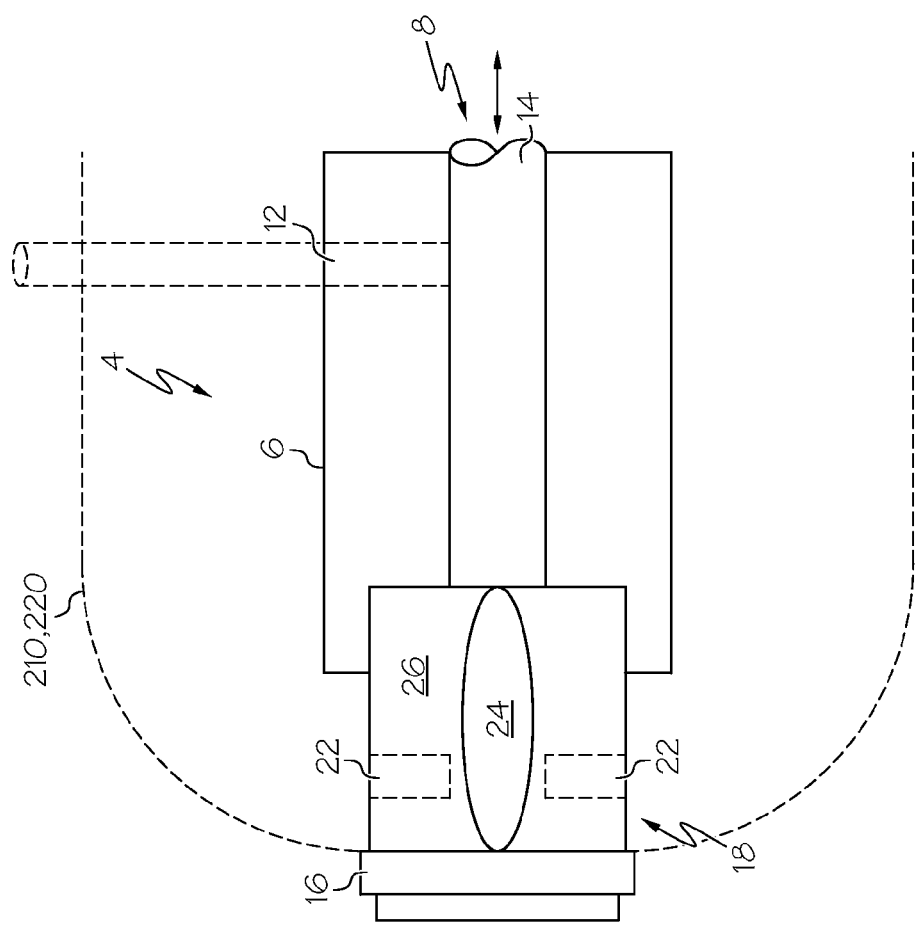
FIG. 4 is a simplified view of an alternative embodiment of a TPRD system according to the present disclosure.

In an alternative embodiment of the present disclosure shown in FIG. 4, the liquid-filled bulb 24 is situated between the pressure sensor 16 and the release piston 14. The pressure sensor 16 detects the pressure exerted on the liquid-filled bulb 24 by the release piston 14. As discussed above in reference to FIG. 3, if the release piston 14 is free to move, the pressure exerted by the release piston 14 will be the same as the pressure within the gas vessel 210, 220 i.e. the pressure throughout the system will be equalized. If the pressure sensor 16 detects a pressure difference between pressure in the gas vessel 210, 220 and the pressure exerted on the liquid-filled bulb 24 by the release piston 14, this signals that the release piston 14 is immovable.

Figure 5:
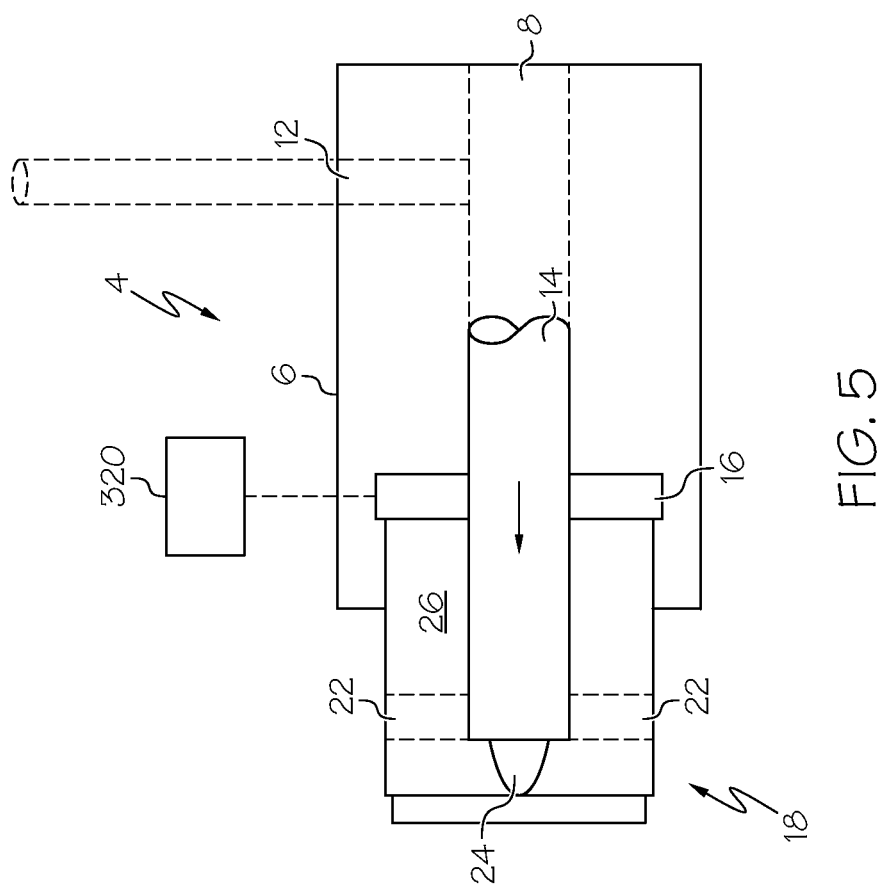
FIG. 5 is a simplified view of an activated TPRD system according to the present disclosure.

FIG. 5 shows the TPRD 4 as described above in reference to FIG. 3 wherein the release piston 14 has moved from the closed position to the open position upon bursting of the liquid-filled bulb 24. In the case where there is no blocking of the release piston 14, upon a rise in temperature sufficient to expand the air bubble within the liquid-filled bulb 24, the liquid-filled bulb 24 will burst and allow the release piston 14 to advance into the space once occupied by the liquid-filled bulb 24. This opens the outlet port 12 and allows gas to vent through the conduit 8 and out of the gas vessel 210, 220 via the outlet port 12. This prevents overpressure conditions and related damage to the system caused by a pressure build-up within the gas vessel 210, 220.

In one form, a controller 320 may be coupled to the pressure sensor 16 of TPRD 4 to receive the sensed pressure signal, as well as to provide output signals (such as indicia of a pressure differential or related abnormal operating condition associated with operation of the TPRD 4). It will be appreciated buy those skilled in the art that such a controller (which may be in the form of a programmable logic controller (PLC)) includes digital processing capabilities designed (through appropriate interfaces) to receive input signals and generate output control signals through a central processing unit (CPU)). Such a controller may also include a computer-readable medium having stored computer-executable instructions thereon. As will be further appreciated, such a controller may form part of a larger control system that can be used to communicate with the various components of propulsion system 100 in order to coordinate their operation, as well as to provide an informational interface between the vehicle 2 and a passenger, driver, or other user.

While certain representative embodiments and details have been shown for purposes of illustrating the invention, it will be apparent to those skilled in the art that various changes may be made without departing from the scope of the invention, which is defined in the appended claims.

What is claimed is:

1. A temperature pressure relief device for use with a fuel storage tank, the device comprising:
a housing having a conduit and a gas outlet port allowing a gas to flow through the housing from the fuel storage tank, and a release piston disposed within the conduit which is moveable between an open and a closed position such that when in the closed position gas cannot flow from the fuel storage tank to the gas outlet port;
an activation mechanism comprising a gas-inlet chamber and a liquid-filled bulb having an air bubble contained therein which is in thermal communication with the gas in said tank, wherein the air bubble expands and bursts the bulb upon a rise in temperature within the fuel storage tank to permit movement of the release piston from the closed position to the open position upon bursting of the bulb; and
a pressure sensor cooperative with the activation mechanism such that upon detection of a difference in pressure between that of a fluid within the fuel storage tank and at least one of pressure exerted on the bulb by the release piston and pressure exerted on the release piston due to the pressure within the fuel storage tank, a signal is generated to provide indicia of impaired movement of the release piston.

2. The temperature pressure relief device of claim 1 wherein the activation mechanism is disposed within a protection cap.

3. The temperature pressure relief device of claim 1 wherein the bulb is situated between the pressure sensor and the release piston.

4. The temperature pressure relief device of claim 1 wherein the pressure sensor is situated between the release piston and the liquid-filled bulb.

5. A fuel storage tank comprising the temperature pressure relief device of claim 1.

6. A fuel cell system comprising:
a fuel cell stack comprising a plurality of fuel cells each of which comprises an anode to accept a hydrogen-bearing fluid, a cathode to accept an oxygen-bearing fluid and a medium cooperative with the anode and the cathode to pass at least one catalytically-ionized reactant there between;
an anode flowpath in fluid communication with the anode;
a cathode flowpath in fluid communication with the cathode; and
a fuel storage tank comprising
a fuel storage tank;
a temperature pressure relief device for use with said fuel storage tank, the device comprising
a housing having a conduit and a gas outlet port allowing a gas to flow through the housing from the fuel storage tank, and a release piston disposed within the conduit which is moveable between an open and a closed position such that when in the closed position gas cannot flow from the fuel storage tank to the gas outlet port;
an activation mechanism comprising a gas-inlet chamber and a liquid-filled bulb having an air bubble contained therein which is in thermal communication with the gas in said tank, wherein the air bubble expands and bursts the bulb upon a rise in temperature within the fuel storage tank to permit movement of the release piston from the closed position to the open position upon bursting of the bulb; and a pressure sensor cooperative with the activation mechanism such that upon detection of a difference in pressure between that of a fluid within the fuel storage tank and at least one of a (a) pressure exerted on the bulb by the release piston and
(b) pressure exerted by the release piston due to the pressure within the fuel storage tank, a signal is generated to provide indicia of impaired movement of the release piston.

7. A method for monitoring a temperature pressure relief device within a high pressure storage vessel comprising:
storing a gas in a fuel storage tank; and
determining the moveability of a release piston by detecting a pressure difference between the gas in the fuel storage tank and the pressure within a temperature pressure relief device wherein the temperature pressure relief device is in fluid communication with the fuel storage tank and comprises a pressure sensor, a release piston, and a liquid-filled bulb situated contiguously; wherein the liquid-filled bulb contains an air bubble therein which is in thermal communication with the gas in said fuel storage tank such that upon a rise in temperature within the fuel storage tank, expansion of the air bubble and consequent bursting of the bulb permits movement of the release piston from a closed position to an open position.

8. The method of claim 7 wherein the pressure sensor is situated between the release piston and the liquid-filled bulb.

9. The method of claim 7 wherein the liquid-filled bulb is situated between the pressure sensor and the piston.

* * * * *